United States Patent [19]
Patterson et al.

[11] Patent Number: 5,818,624
[45] Date of Patent: Oct. 6, 1998

[54] MASK FOR VIEWING REDUCED-SIZE RADIOGRAPHIC FILM, PARTICULARLY MAMMOGRAPHY FILM

[76] Inventors: John Patterson, 1904 Darnell St., Libertyville, Ill. 60048; Raynor Sturgis, 81 Indian Hill Rd., Winnetka, Ill. 60093; Hugh Walborn, 529 Williamsburgh, Glen Ellyn, Ill. 60137; Lawrence Wilhelm, 1831 N. Orleans St., Chicago, Ill. 60614

[21] Appl. No.: 579,298

[22] Filed: Dec. 27, 1995

[51] Int. Cl.$^6$ ............................. G02B 26/02; G02B 27/02
[52] U.S. Cl. ...................... 359/227; 359/601; 359/893; 359/894; 40/361
[58] Field of Search ................................. 359/227, 229, 359/599, 450, 601, 893, 894; 362/97; 40/361, 367

[56] References Cited

U.S. PATENT DOCUMENTS

| | | | |
|---|---|---|---|
| 1,172,426 | 2/1916 | Caldwell | 40/361 |
| 1,988,654 | 1/1935 | Haag | 40/361 |
| 2,436,162 | 2/1948 | Cadenas | 40/361 |
| 3,112,887 | 12/1963 | Brou et al. | 362/97 |
| 3,246,412 | 4/1966 | Sommeroff | 40/361 |
| 3,344,705 | 10/1967 | Gordon | 359/227 |
| 3,802,102 | 4/1974 | Licciardi | 40/132 R |
| 3,803,737 | 4/1974 | Beckett | 40/106.1 |
| 3,953,764 | 4/1976 | Miller et al. | 315/386 |
| 4,004,360 | 1/1977 | Hammond | 40/106.1 |
| 4,373,280 | 2/1983 | Armfield, III | 40/367 |
| 4,468,720 | 8/1984 | Arai | 362/281 |
| 4,510,708 | 4/1985 | Pokrinchak | 40/361 |
| 4,578,887 | 4/1986 | Timpe et al. | 40/361 |
| 4,775,918 | 10/1988 | Snyder | 362/18 |
| 5,159,771 | 11/1992 | Ohlson | 40/361 |
| 5,285,268 | 2/1994 | Nakagaki et al. | 348/760 |
| 5,392,545 | 2/1995 | Claman et al. | 40/159 |
| 5,430,964 | 7/1995 | Inbar et al. | 40/361 |

*Primary Examiner*—Paul M. Dzierzynski
*Assistant Examiner*—John Juba, Jr.
*Attorney, Agent, or Firm*—Lockwood, Alex, Fitzgibbon & Cummings

[57] ABSTRACT

A radiographic film mask includes a planar sheet sized for receipt on an illuminated radiographic film examination box. The mask has two opaque sections and a transparent section. The transparent section is disposed on the sheet between the two opaque sections to form a radiographic film viewing area which has an area less than the entire area of the sheet. The sheet may include semi-transparent sections which border the viewing area and interconnect the opaque portions to provide reduced transmission of light along the marginal edges of the radiographic film.

32 Claims, 3 Drawing Sheets

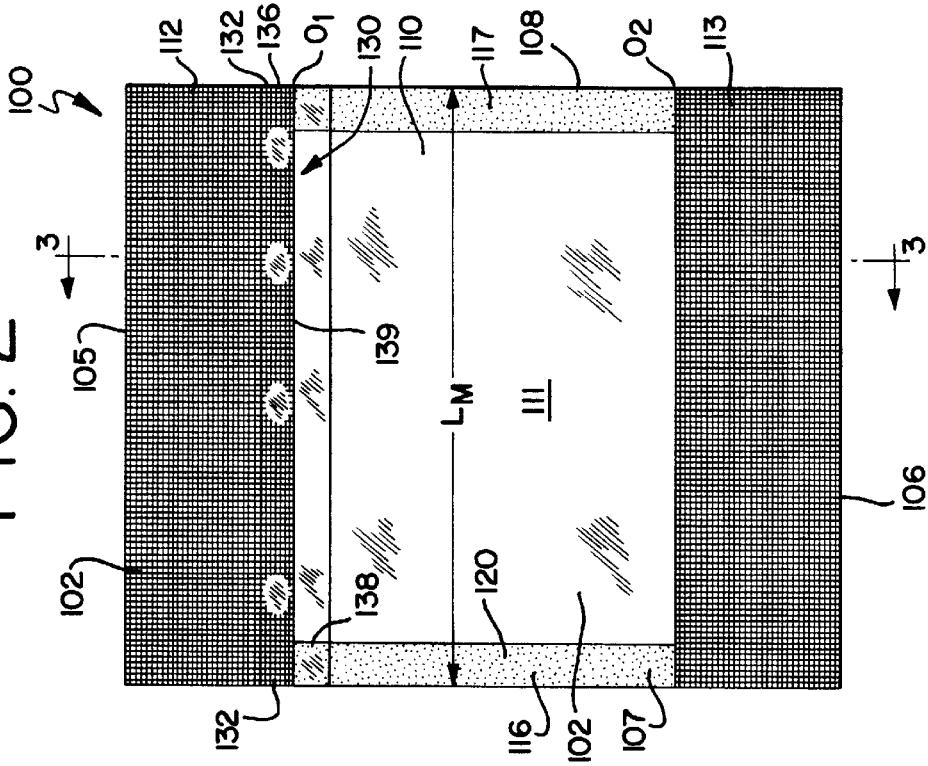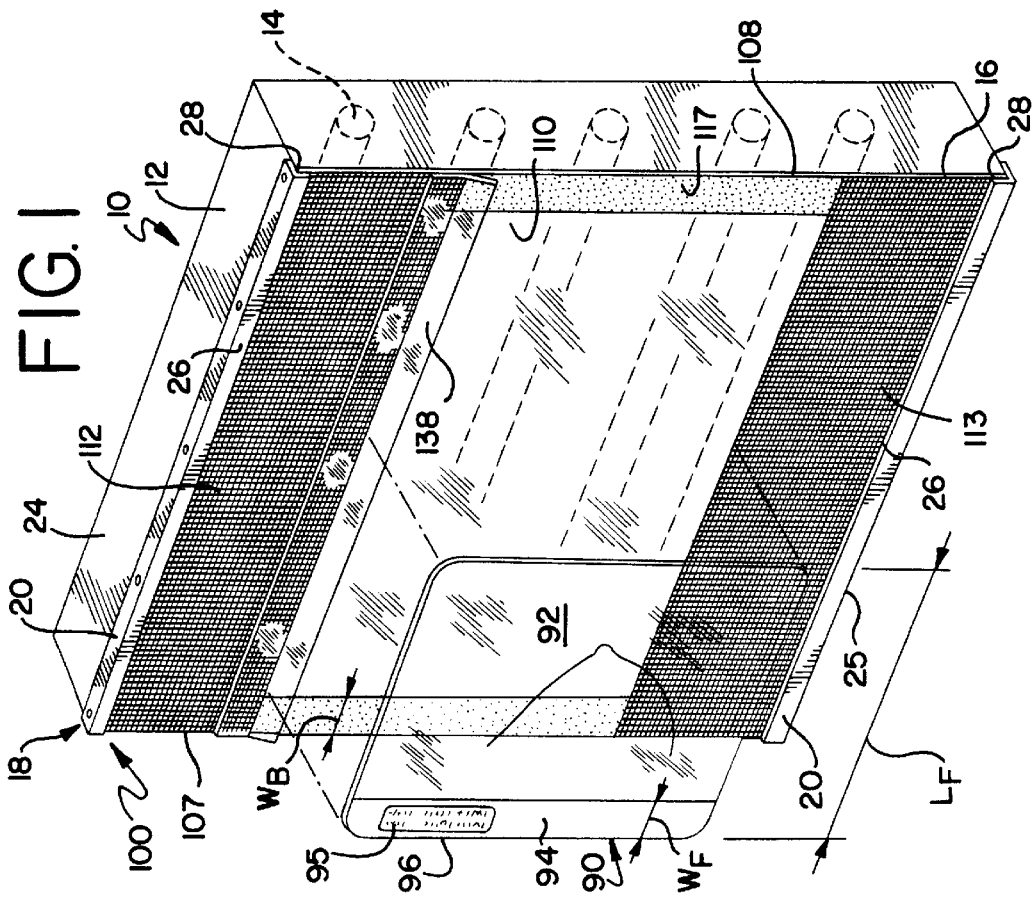

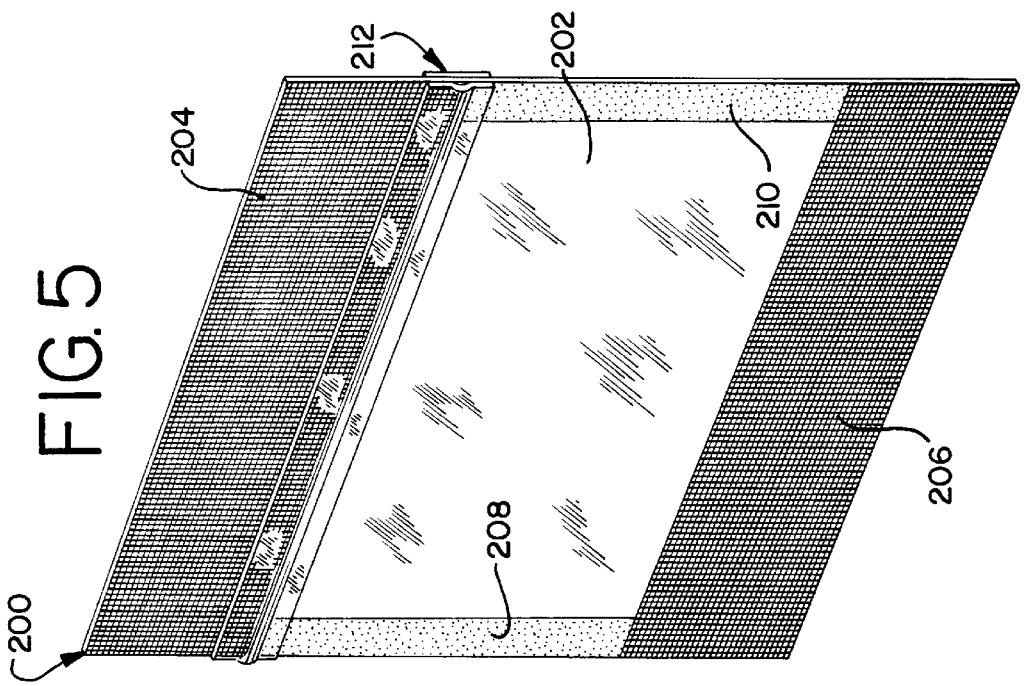
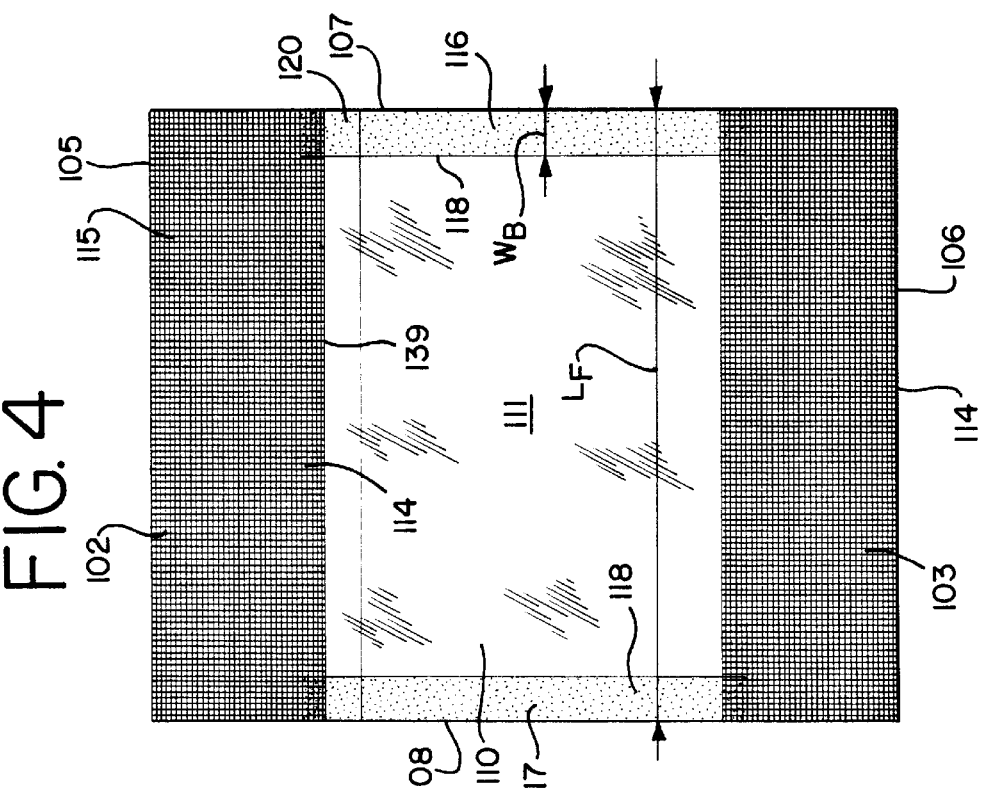
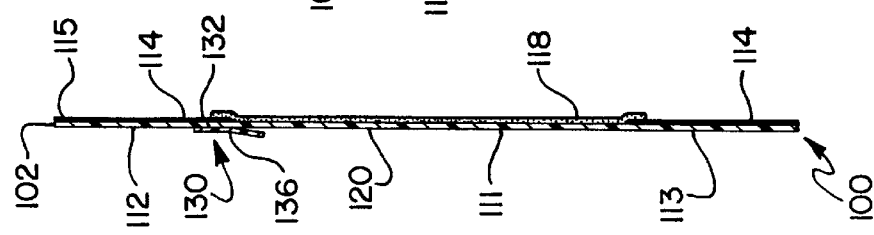

MASK FOR VIEWING REDUCED-SIZE RADIOGRAPHIC FILM, PARTICULARLY MAMMOGRAPHY FILM

BACKGROUND OF THE INVENTION

The present invention relates generally to radiography films and the viewing of such films in a radiographic film viewers, and more particularly to a radiography film mask which enhances the viewability of reduced-size radiographic films.

Radiographic films, such as X-ray, mammography films and the like are widely used in the medical profession. Such films are usually examined by a physician or specialist by placing the films onto an radiographic film viewing apparatus against an illuminated screen or panel portion of the apparatus. Most conventional radiographic film viewing apparatus have viewing surfaces of a standard size, approximately 14 by 17 inches. This standard size corresponds to standard size radiography films which are also approximately 14 by 17 inches. These viewing apparatus typically include a housing, a viewing panel, an illumination source mounted in the housing behind the viewing panel. The illumination source typically includes multiple fluorescent lights.

Smaller size radiographic films are used today in particular applications with greater frequency. Such films include mammography films, which have dimensions of approximately 7 by 9½ inches. Viewing such reduced-size radiographic films on conventional sized radiographic film viewers creates problems which may affect the ability of a radiologist to easily read the film. One such problem is the reduced-size radiographic films are dominated by a large open, viewing area which surrounds the film. Light from the illumination source of the viewing apparatus will shine through this large open area and remain illuminated. This extraneous illumination will result in glare which will detract from the visual perception of the person studying the radiographic film and assessing the information it contains. The government has adopted standards for the illumination of reduced-size radiography films, such as mammograms and is also considering the adoption of standards with respect to ambient light and masking such films during examination.

In order to eliminate this detrimental glare and to standardize the illumination for the film by concentrating it only on a film being viewed, radiography masks have been developed which block the open area of the viewer surrounding the "reduced-size" radiographic films. One such known mask includes a base with "pockets" which hold a reduced-size radiography film in place upon a viewing apparatus. These pocketed structures are large and bulky and the pockets do not permit the individual films inserted therein to be marked with comments by the viewer. Additionally, such complex mask structures are not adaptable for use on a rotary viewing apparatus.

Another masking apparatus is described in U.S. Pat. No. 4,004,360, issued Jan. 25, 1977. This X-ray viewing apparatus has a self-masking feature which is complex and expensive in that the viewing apparatus viewing surface is perforated to define a pneumatic plenum. The perforations lead into the interior of the viewing apparatus to a series of discrete chambers or grids, each of which has a separately actuable mask member contained therein. A vacuum is drawn on the interior of the viewing apparatus to selectively activate the discrete mask members. This masking apparatus is complex and expensive because it requires a particular complex construction and a vacuum pump for operation, and therefore it is highly impractical for widespread commercial use.

The present invention is therefore directed to an inexpensive radiography film mask which overcomes the aforementioned disadvantages by providing a viewing opening which corresponds in size to the reduced-size radiography film and a surrounding masking portion which masks the extraneous portions of a radiographic viewing apparatus which surround reduced-size radiography films to eliminate problems in reading the films, such as glare and density problems.

SUMMARY OF THE INVENTION

In one principal aspect, the present invention includes a mask having a generally planar sheet or body which has dimensions substantially the same as the dimensions of the viewing apparatus, approximately 14 by 17 inches. Two opaque sections are formed on a surface of the sheet and extend along two edges of the sheet. These opaque sections extend from the two edges to the interior of the sheet where they define and border upon a transparent section. The transparent section, as bordered by the opaque sections, defines a transparent viewing window of reduced-size, i.e., having an area less than the entire viewing surface of the film viewing apparatus, thereby permitting reduced-size radiographic films to be easily viewed on a conventional-size radiographic viewing apparatus.

In another principal aspect of the present invention, the sheet includes a radiographic film support member disposed on one surface and extending along an interface of the opaque and transparent sections. As demonstrated in one embodiment of the invention, the film support member includes a first flange section which is attached to the mask and a second flange section which extends therefrom and which forms an engagement slot which engages a leading edge of a radiography film inserted therein. In another embodiment of the invention, the film support member includes a flexible hinge which interconnects the two flange sections and which may include a reinforcement flange which permits the mask to be utilized in a rotary film viewer.

In yet another principal aspect of the present invention, and in an embodiment of the invention having two opaque sections, the opaque sections of the mask are disposed along opposing top and bottom edges of the base sheet so that the transparent section is located generally in the center portion of the sheet. The transparent section extends between opposite sides of the mask and may be further defined by one or more semi-transparent sections which interconnect the opaque sections and serve to enclose the transparent section in a manner such that the transparent section forms a reduced-size viewing window for the mask. These semi-transparent sections are aligned with outer edges of the reduced-size radiographic film and advantageously reduce the amount of light transmitted through the radiographic film outer edges, but permit enough light transmission so that any identifying indicia placed along these outer edges may be read when the reduced-size film is examined on a viewing apparatus utilizing a mask of the invention.

Accordingly, it is a general object of the present invention to provide an improved radiographic film mask which is particularly suitable for use with reduced-size radiographic films, such as mammography films, which permits reduced-size radiographic films to be easily viewed on a conventional radiographic film viewing apparatus.

It is another object of the present invention to provide a radiographic film mask having a transparent section defining a film-viewing window and at least one opaque section extending from an edge of the mask to a predetermined position at the interior of the mask to the transparent section, the opaque section isolating the film-viewing window from the mask edge.

It still another object of the present invention to provide a radiography film mask particularly suitable for viewing mammography films in which the mask includes a mask body in the form of a planar base sheet having two opaque sections and at least one transparent section disposed thereon in a manner so as to define a reduced-size viewing window within the borders of the mask body, the viewing window having an area less than the area of the mask body, the opaque sections being disposed along two opposing borders of the mask body in parallel arrangement with respect to each other, the transparent section thereby lying interior of opaque sections, the mask body further including semi-transparent sections adjoining two remaining borders of the mask body and cooperating with the opaque sections to isolate the transparent section from the borders of the mask body, the semi-transparent sections providing areas of reduced light intensity along opposing edges of the viewing window.

These and other objects, features and advantages of the present invention will be apparent through a reading of the following detailed description, taken in conjunction with accompanying drawings, wherein like reference numerals refer to like parts.

BRIEF DESCRIPTION OF THE DRAWINGS

In the course of the description, reference will be made to the attached drawings in which:

FIG. 1 is a perspective view of a first embodiment of a radiographic film mask constructed in accordance with the principles of the present invention shown in place upon a radiographic film viewing apparatus and with a reduced-size radiographic film aligned for insertion into the mask;

FIG. 2 is a frontal elevational view of the radiographic film mask of FIG. 1;

FIG. 3 is an end elevational view of the mask of FIG. 2 taken along lines 3—3 thereof;

FIG. 4 is a rear elevational view of the mask of FIG. 2;

FIG. 5 is a perspective view of a second embodiment of a radiographic mask constructed in accordance with the principles of the present invention;

DETAILED DESCRIPTION OF THE PREFERRED EMBODIMENTS

Figure 6:
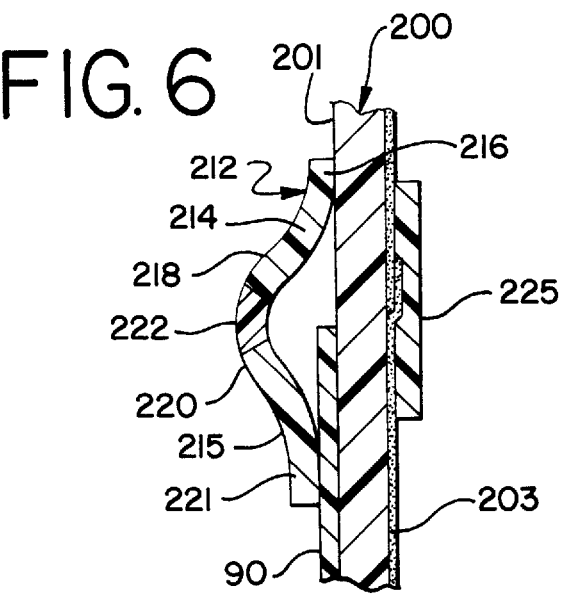
FIG. 6 is an enlarged end view of FIG. 5.

FIG. 1 illustrates a conventional radiographic film viewing apparatus 10 used in the viewing and examination of radiographic films. The viewing apparatus 10 includes a metal rectangular housing 12 and an illumination source, illustrated as fluorescent lights 14 disposed within the housing. The viewing apparatus has a front panel 16 which defines a planar viewing surface of the apparatus 10. This panel 16 is spaced a predetermined distance away from the illumination source 14 in order to provide a recommended consistent and even level of illumination to radiographic films occupying the entire area of the viewing panel 16.

One or more film retainer members 18, illustrated as angle clips 20, may be provided along one or more borders of the viewing apparatus 10, such as the top and bottom edges 24 & 25 as illustrated. The clips 20 may include flanges 26 which define slots 28 along the front panel 16 for a receiving the opposing top and bottom edges of a radiographic film therein.

As mentioned above, conventional radiographic films have sizes of approximately 14 by 17 inches. In order to accommodate the easy viewing and examination of these films, viewing apparatus, such as that illustrated at 10, are generally of the same or slightly larger dimensions than that of the film itself, i.e., either approximately 14×17 inches or slightly greater than 14×17 inches. However, certain radiographic films are smaller than the conventional 14×17 inch size. These reduced-size radiographic films are therefore dwarfed by the overall size of the viewing apparatus 10 and the viewing panel 16 thereof when the reduced-size film is placed upon the viewing apparatus 10.

Figure 7:
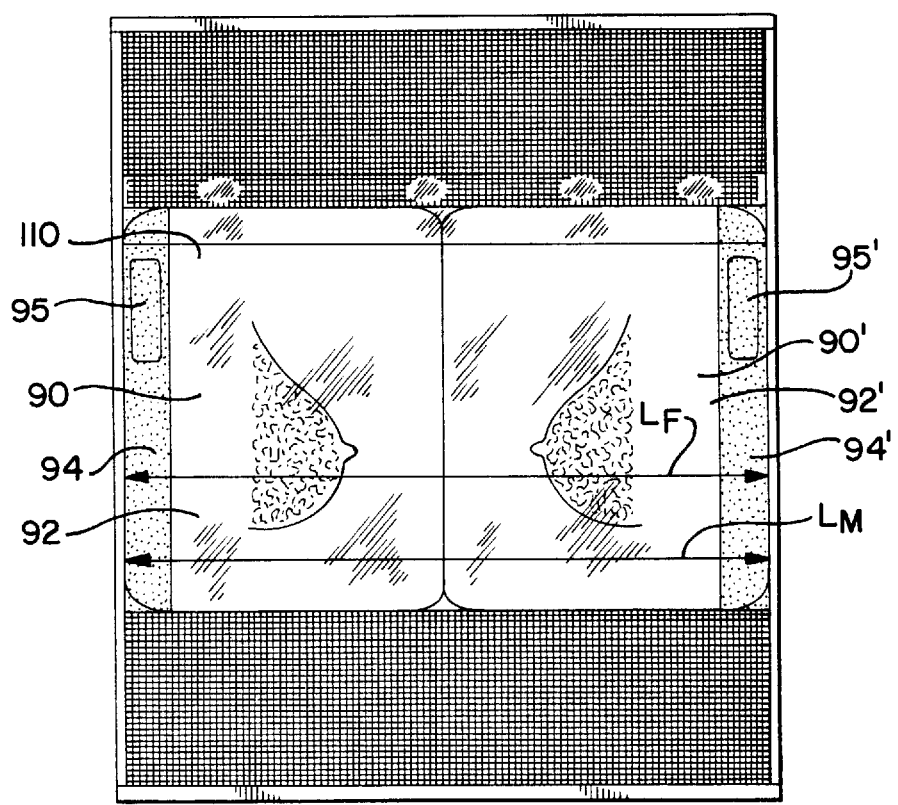
FIG. 7 is a frontal elevational view of a mask of the present inventions in place upon a film viewing apparatus with two reduced-size radiography films inserted therein.

One such reduced-size film is mammography film. A mammography film, for example, typically has dimensions of approximately 7 by 9½ inches. Such a film is illustrated in FIGS. 1 & 7 at 90. The mammography film 90 has an image portion 92 and a marginal portion 94 extending along a marginal edge 96 of the film 90. This marginal portion 94 typically has a width of about 1 inch or less and contains certain identifying indicia 95 as such patient name, address and/or film number. The marginal portion 94 typically has a density much less than that of the image portion of the film. As illustrated in FIG. 1, the mammography film 90 is reduced in size with respect to the overall size of the viewing panel 16 of the viewing apparatus 10. Hence, a large open area 30 is defined on the viewing panel 16 which surrounds the reduced-size film 90. This exposed, open area 30 is therefore illuminated by the viewing apparatus lights 14 and presents glare which may detract from the examination of the reduced-size film 90. Additionally, the light appearing in the open area 30 may alter the density of the reduced-size film 90 as perceived by the examiner.

The present invention is directed to a radiography film mask 100 which permits the viewing of reduced-sized radiography films, such as mammography films, on conventional-size radiography viewing apparatus 10 and also enhances the viewing of such films by masking substantially all of the open area 30 on the viewing panel 16 which surrounds the reduced-size radiography film 90 when in place on the viewing apparatus 10. Although in the following detailed discussion the present invention is described and illustrated in the context of an application for mammography films, it will be understood that the present invention will have equally suitable applicability for other reduced size radiographic films, such as panoramic dental X-rays and the like.

Turning now to FIGS. 1 & 2, a first embodiment of a radiography film mask 100 constructed in accordance with the principles of the present invention is seen to comprise a generally planar body portion in the form of a clear plastic base sheet 102 having dimensions approximately equal to that of the viewing apparatus 10, typically 14 by 17 inches. The base sheet 102 includes four edges 105–108 which cooperate to define the perimeter of the mask body portion. The edges include a pair of top and bottom edges 105, 106 and a pair of opposing side edges 107, 108. The top and bottom edges 105, 106 of the mask 100 may conveniently fit into the slots 28 defined by the viewing apparatus film clips 20.

The base sheet 102 includes a reduced-size transparent section 110 in the form of a viewing window 111, which preferably has dimensions equivalent to or slightly less than that of the reduced-size radiographic films intended for viewing, such as the mammography film 90. Window dimensions of approximately 11½ by 8¾ inches have proved suitable in practice for the viewing of mammography films. In order to define the transparent viewing window 110 on the base sheet 102, the mask body may include one or more opaque sections 112, 113, which extend along two opposing edges of the mask 100, shown as the top and bottom edges 105 and 106. By "opaque", it is meant that the sections 112, 113 are substantially impervious to light, i.e., they do not permit light from the viewing apparatus 10 to pass through the respective portions of the viewing apparatus 10 which the opaque sections 112, 113 cover when the mask 100 is in place upon the viewing apparatus 10.

The opaque sections 112, 113 extend from the base sheet edges 105, 106 toward the interior of the base sheet 102 to one or more predetermined positions, or datums, $O_1$ and $O_2$ at which they abut the transparent section 110. The length $L_M$ of this window 110 is preferably equal to or slightly less than a corresponding width $L_F$ of the one or more reduced-size films 90 in place in the mask 100 in the viewing apparatus 10 so that no light-transmitting "cracks" or openings occur when the film 90 is inserted into place on the base sheet 102. The opaque sections 112, 113 may be formed on the mask body in a number of ways, such as by way of paint, tape, dye or the like. When the opaque sections 112, 113 are printed or painted on the mask 100, as illustrated in the first embodiment of FIGS. 1–4, it can be seen from FIG. 3 that the opaque sections 112, 113 may then comprise layers 114 applied to the rear surface 115 of the mask body. Although two opaque sections 112, 113 are illustrated in the Figures, it will be understood that one such section may be used in combination with a transparent section. Additionally, the opaque sections 112, 113 need not be oriented along the opposing edges 105, 106 of the mask, but they may also be oriented along intersecting edges of the mask, for example, along edges 102, 113.

In an important aspect of the present invention, the mask 100 may also include one or more semi-transparent sections 116, 117 disposed along the two opposing side edges 107, 108. These semi-transparent sections 116, 117, extend along the base sheet edges 107, 108 between the two opaque sections 112, 113 across the transparent section 110 of the mask 1100 in which the viewing window 111 is located. The semi-transparent sections 116, 117 further cooperate with the opaque sections 112, 113 to enclose the viewing window portion 111 of the transparent section 110. The semi-transparent sections 116, 117 thus may be considered as isolating the viewing window 111 from the side edges 107, 108 of the base sheet 102.

Whereas the opaque sections 112, 113 of the mask 100 are impervious to light, the semi-transparent sections 116, 117 permit the passage of some light through the base sheet 102, but at a reduced level as compared to the passage of light through the transparent section 110. This reduction in light intensity is significant because the semi-transparent sections 116, 117 have a width $W_B$ which matches or slightly exceeds a corresponding width $W_f$ of the reduced-size film marginal portion 94 so that when reduced-size films 90 are placed onto the mask 100, the semi-transparent sections 116, 117 are aligned with the marginal portions 94 of the film 90 in a manner to thereby reduce light transmission and reduce the amount of light interference or glare encountered in reading of the film 90 in place on the viewing apparatus 10 than would occur without the semi-transparent sections 116, 117. The width of the semi-transparent sections 116, 117 is desirably about the same as the width of the film marginal portions 94 and the density of the semi-transparent sections 116, 117 is such that they permit the identifying indicia 95 of the film 90 to be read in place on the viewing apparatus 10. This is best shown in FIG. 7, wherein the viewing window 11 is large enough to accommodate two reduced-size radiography films 90, 90' for comparison or other examination purposes.

The semi-transparent sections 116, 117 may be formed on the mask body by providing a visual pattern, such as a stippling 120 to the mask 100. In the preferred embodiment, such stippling may be formed by way of applying a screen similar to a halftone screen used in the printing industry onto the rear surface 115 of the mask base sheet 102. (FIG. 3.) The screen may also be printed or otherwise formed separately and then adhered to the rear surface 115 of the base sheet 102. In either process the semi-transparent sections 116, 117 may, as illustrated, take the form of separate layers 118 which overlie the opaque section layers 114 or they may underlie these layers. A screen having a screen percentage (or density) equal to about a 60% halftone screen has produced desirable results and it is believed that screens having screen percentages ranging from about 30% to about 80% will give like desirable results.

The mask 100 also preferably includes a means for supporting the reduced-size films 90 thereon during viewing FIGS. 1–3 illustrates one embodiment of such a film support means suitable for use with the mask, shown as a film clip 130 applied to a front surface 120 of the base sheet 102. The film clip 130 is preferably positioned on the base sheet 102 in alignment with the viewing window 110. The film clip 130 may include a series of functional sections defined thereon, such as first and second flange sections 132, 138. The first flange section 132 is generally planar in configuration and includes an attachment portion 134 (shown positioned at the top of the first flange section 132 in FIGS. 2 & 3) which is attached to the base sheet 102. This attachment may be effected by adhesives, plastic welding or other suitable methods.

The first flange section 132 may further include a film engagement portion 136 which extends from the attachment portion 134 generally close to and parallel to the front surface 120 of the mask base sheet 102. This engagement portion 136 is maintained in close proximity to the base sheet front surface 120 by way of the attachment portion 134 of the first flange section 132 and serves to hold the top edges of any films 90 inserted therein in place upon the viewing apparatus 10. In order to facilitate the insertion of the film 90 into the engagement portion 136, the film clip 130 may be provided with an angled second flange section 138 which extends away from the front surface 120 of the mask sheet 102 from an intermediate point 139 of the film clip 130. Although illustrated as positioned along the top edge of the viewing window 110, it will be understood that the film support means may also be positioned along the bottom edge of the viewing window 110.

FIGS. 5 & 6 illustrate a second embodiment 200 of a reduced-size film mask constructed in accordance with the principles of the present invention. The structural components of this mask 200 are generally the same as those of the mask 100 of FIGS. 1–4, such as a transparent section 202, opaque sections 204, 206 and semi-transparent sections 208, 210. The major difference however in this embodiment 200 occurs in the film clip 212. As best illustrated in FIG. 6, the film clip 212 again includes two adjoining sections, shown as first and second legs 214, 215. The first leg 214 includes a base portion 216 which is attached to the front surface 201 of the mask 200 and a crown portion 218 which rises upwardly therefrom. The second leg 215 is similar and includes a crown portion 220 and base portion 221 which extends from the crown portion 220 toward the mask surface 201.

The two legs 214, 215 of the clip 212 are preferably interconnected at their crown portions 218, 220 by a flexible hinge portion 222 which is formed from a more flexible material than the two legs 214, 215 of the film clip 212. Such a clip 212 may be effectively produced by coextruding the flexible material with a more rigid material used for the legs 214, 215 in manners well known in the art.

The mask 200 may also include a reinforcement member 225 applied to the rear surface 203 of the mask 200 in alignment with the film clip 212. This member extends substantially entirely between the side edges of the mask 200, and provides a reinforcement to the film clip 212 which maintains the film clip 212 in an engaged position with the film 90 should the mask and film be angled or curved such as may occur when the film 90 is viewed in a rotary viewing apparatus. In this regard, the reinforcement member 225 preferably has a length approximately equal to the width of the mask 200 or its film clip 212.

It will be seen that the present invention provides a reliable and inexpensive mask for use in viewing reduced-size radiography films and particularly mammography films which advantageously blocks the light from the area of the viewing apparatus surrounding the reduced-size film and effectively reduces problems caused by the glare and brightness of such light.

It will be appreciated that the embodiments of the present invention which have been discussed are merely illustrative of some of the applications of this invention and that numerous modifications may be made by those skilled in the art without departing from the true spirit and scope of this invention.

We claim:

1. A radiographic film mask for masking off a selected area of a viewing surface of an underlying film viewer to permit the viewing of reduced-size radiographic films on the viewer, the reduced-size films being reduced in size with respect to the film viewer, said viewer having a viewing surface and a source of light disposed behind the viewing surface, the mask comprising:

a mask body for attachment to the viewing surface of said viewer, the mask body having distinct opaque and transparent sections disposed thereon, the opaque section preventing transmission of substantially all light from said light source through said mask body at said opaque section, the transparent section permitting transmission of substantially all light from said light source through said mask body at said transparent section, said mask body further including at least one semi-transparent section disposed along an edge of said transparent section, the semi-transparent section permitting reduced transmission of light from said light source through said body portion at said semi-transparent section, said opaque and semi-transparent sections cooperating together to define a reduced-size transparent viewing window on said body portion for reduced-size radiographic films placed thereon such that said semi-transparent section are aligned with indicia-bearing portions of the reduced-size film, whereby said opaque sections mask out a substantial portion of said viewing surface surrounding said reduced-size film and said semi-transparent sections reduce the transmission of light through said viewing surface surrounding the remainder of said reduced-size film but transmit enough light to permit reading of indicia present on said indicia-bearing portions of said reduced-size film.

2. The radiographic film mask as defined in claim 1, further including a film support member disposed on said mask body proximate to said transparent section, said film support member including means for supporting said reduced-size films upon said mask body in proximity to said transparent section.

3. The radiographic film mask as defined in claim 2, wherein said film support member is disposed on a first surface of said mask body and a reinforcement member is disposed on a second, opposite surface of said mask body, the reinforcement member being aligned with said film support member.

4. The radiographic film mask as defined in claim 3, wherein said reinforcement member includes an elongated strip having a length substantially equal to a length of said film support member.

5. The radiographic film mask as defined in claim 1, wherein said mask body includes two distinct opaque sections spaced apart from each other on opposite sides of said transparent section.

6. The radiographic film mask as defined in claim 5, further including two distinct semi-transparent sections which extending between said opaque sections, said opaque and semi-transparent sections cooperating to define a border surrounding said transparent section and defining a reduced-size transparent viewing window of said mask.

7. The radiographic film mask as defined in claim 1, wherein said opaque and semi-transparent sections are distinct layers applied to a surface of said mask body.

8. The radiographic film mask as defined in claim 1, wherein said opaque and semi-transparent sections are printed on a surface of said mask body.

9. The radiographic film mask as defined in claim 1, wherein said semi-transparent sections include stippled sections.

10. The radiographic film mask as defined in claim 1, wherein said semi-transparent section includes a screened portion.

11. The radiographic film mask as defined in claim 10, wherein said screen portion has a screen percentage ranging between from about 30% to about 80%.

12. The radiographic film mask as defined in claim 2, wherein said film support member includes a film clip having a first portion attached to said mask body and a second portion which engages a reduced-size radiographic film.

13. The radiographic film mask as defined in claim 12, said support member first and second portions are interconnected by a flexible hinge portion.

14. The radiographic film mask as defined in claim 1, wherein said transparent section has a generally rectangular configuration.

15. The radiographic film mask as defined in claim 5, wherein said two opaque sections are disposed along opposing edges of said mask body and said transparent section is disposed between said opaque sections.

16. The radiographic film mask as defined in claim 13, wherein said film clip first, second and hinge portions are coextruded.

17. An apparatus for masking the open area of a radiographic film examination means which surrounds a radiographic film placed on a viewing surface of the examination means in order to reduce the amount of extraneous light occurring in the open area of the viewing surface and interfering with examination of the radiographic film, the radiographic film being reduced in size with respect to said examination means, comprising:

a mask plate adapted for mounting to said viewing surface, the mask plate having a perimeter which approximates a perimeter of said viewing surface, at least one opaque section extending from a first edge of the mask plate perimeter to a first predetermined line of said mask plate; and at least one semi-transparent section disposed adjacent to said opaque section and extending along a second edge of said mask plate perimeter, said opaque and semi-transparent sections cooperating together to define a transparent section of reduced size with respect to said viewing surface and disposed within an interior portion of said mask plate, the transparent section adjoining said opaque section along said first predetermined line and further adjoining said semi-transparent section along a second predetermined line which intersects with said first predetermined line, whereby said opaque section blocks substantially all light from said examination means from illuminating said open area surrounding said transparent section and said semi-transparent section substantially reduces light from said examination means in the remainder of said viewing surface open area when an illumination source of said examination means is activated.

18. The masking apparatus as defined in claim 17, further including a second opaque section disposed along a third edge of said mask plate perimeter generally opposite said first edge, said second opaque section extending from said third edge to a third predetermined line of said mask plate, said transparent section being disposed between said two opaque sections and along said first and second predetermined lines.

19. The masking apparatus as defined in claim 17, further including a second semi-transparent section disposed adjoining said transparent section along a fourth predetermined line and further along a fourth edge of said mask plate perimeter generally opposite said third edge, said semi-transparent sections interconnecting said two opaque sections, thereby forming a reduced-size film viewing window contained entirely within said perimeter of said mask plate.

20. The masking apparatus as defined in claim 17, wherein said semi-transparent section includes at least one screened portion.

21. The masking apparatus as defined in claim 20, wherein said screened portion has a screen percentage ranging from about 30% to about 80%.

22. The masking apparatus as defined in claim 19, wherein said mask plate includes a clear planar substrate and said opaque and semi-transparent sections are formed on a surface of said mask plate by applying distinct opaque and semi-transparent layers to said surface.

23. The masking apparatus as defined in claim 17, further including a film clip for supporting a radiographic film in place upon said mask plate such that said radiographic film is substantially aligned with said transparent section.

24. A radiographic film mask for viewing reduced-size radiographic films on an illuminated radiographic film examination apparatus in which the examination apparatus has a viewing surface of a first predetermined area, a light source disposed behind the viewing surface for illuminating the viewing surface and radiographic films placed thereupon, the mask covering a portion of said viewing surface to thereby define a reduced viewing surface having a second predetermined area less than said first predetermined area and which corresponds generally to said reduced-size radiographic film, said mask comprising:

a planar substrate having a area substantially equal to said examination apparatus viewing surface, the substrate having opaque sections adhered to said substrate extending from distinct first and second edges of said substrate inwardly to define two distinct reduced-size radiographic film alignment edges which border said reduced viewing surface, said substrate further including a transparent section defined thereon and lying adjacent to said opaque sections and which defines said second predetermined area of said reduced viewing surface, said opaque sections masking out substantially all light from said examination apparatus in the area surrounding said reduced viewing surface.

25. The radiographic film mask as defined in claim 24, wherein said opaque sections are aligned along respective first and second opposing edges of said substrate and said transparent section is disposed between said opaque sections and said substrate first and second edges.

26. The radiographic film mask as defined in claim 24, further including a radiographic film engagement member attached to said substrate and aligned with said transparent section reduced viewing surface, said film engagement member including a film engagement flange lying adjacent to a surface of said substrate, said film engagement flange defining a film-receiving slot between said flange and said substrate surface.

27. The radiographic film mask as defined in claim 24, further including at least one semi-transparent section formed on said substrate and disposed adjacent to said opaque and transparent sections.

28. The radiographic film mask as defined in claim 27, wherein said semi-transparent section lies adjacent a third edge of said substrate.

29. The radiographic film mask as defined in claim 24, further including two semi-transparent sections disposed adjacent said transparent and opaque sections and further aligned with third and fourth opposing edges of said substrate which intersect with said first and second edges of said substrate.

30. The radiographic film mask as defined in claim 27, wherein said semi-transparent section includes a halftone screen portion.

31. The radiographic film mask as defined in claim 29, wherein said opaque sections and said semi-transparent sections enclose said transparent section reduced viewing surface and to define the borders thereof.

32. A radiographic film mask for viewing reduced-size radiographic films on an illuminated radiographic film examination apparatus, in which the examination apparatus has a viewing surface with a first predetermined area, a light source disposed behind the viewing surface for illuminating the viewing surface and radiographic films placed thereupon, the reduced size radiographic films having an area less than the area of said viewing surface, the mask covering a portion of said viewing surface to thereby define a reduced viewing surface having a second predetermined area less than said first predetermined area and which corresponds generally to said reduced-size radiographic film, said reduced-size radiographic film bearing an indicia on one portion thereof said mask comprising:

a planar substrate having an area not greater than said viewing area, the substrate having at least one opaque section disposed thereon extending from an edge of said substrate inwardly to define at least one distinct reduced-size radiographic film alignment edge which borders upon an edge of said reduced viewing surface, said substrate further including at least one transparent section disposed thereon and adjacent to said opaque section, the transparent section defining said second predetermined area of said reduced viewing surface, and, at least one semi-transparent section disposed adjacent to said opaque and transparent sections, said semi-transparent section substantially reducing transmission of light through said semi-transparent section but transmitting enough light to permit reading of said indicia present on said reduced-size radiographic film portions.

* * * * *